United States Patent [19]

Akczinski, Sr.

[11] 4,105,239

[45] Aug. 8, 1978

[54] MAGNETIC TOOL

[76] Inventor: Joseph J. Akczinski, Sr., 317 Shipley Ave., Glen Burnie, Md. 21061

[21] Appl. No.: 780,773

[22] Filed: Mar. 24, 1977

[51] Int. Cl.[2] .............................................. F16C 11/04

[52] U.S. Cl. .................................. 294/65.5; 294/19 R

[58] Field of Search ............... 294/65.5, 19 R, 2, 19.1, 294/23.5, 23, 22, 21, 20; 160/53, 138, 139, 140, 141; 335/293

[56] References Cited

U.S. PATENT DOCUMENTS

| | | | |
|---|---|---|---|
| 2,731,291 | 1/1956 | Bellini et al. | 294/19 R |
| 2,966,379 | 12/1960 | Ingersoll | 294/57 |
| 3,384,408 | 5/1960 | Furzey | 294/65.5 |
| 3,582,123 | 6/1971 | Kyser | 294/65.5 |
| 4,017,082 | 4/1977 | Channing et al. | 294/65.5 |

*Primary Examiner*—James B. Marbert
*Attorney, Agent, or Firm*—Morton J. Rosenberg

[57] ABSTRACT

A magnetic tool for releaseably securing thereto metallic members which are magnetically attractable. The magnetic tool includes a magnetic element securely fastened to a first handle section. The first handle section is removably mounted to a telescoping handle portion of the magnetic tool. The telescoping portion of the magnetic tool allows for extended longitudinal length adjustment of the magnetic tool for the purpose of picking up metallic members from a base surface which is substantially displaced from the user. Removal of the telescoping handle portion of the magnetic tool allows the user to utilize the first handle section over an area having a base surface which is substantially closer to the user. The magnetic tool is constructed in particular for use by a handicapped person where manipulation of a tool of this nature is extremely difficult. Thus, a handicapped person may from one positionally restrained location pick up metallic members from a floor surface or from a particular desk top area.

5 Claims, 6 Drawing Figures

FIG. 1
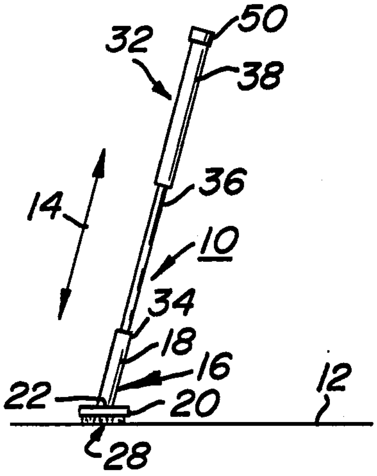
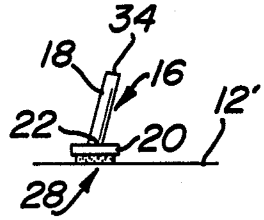
FIG. 2
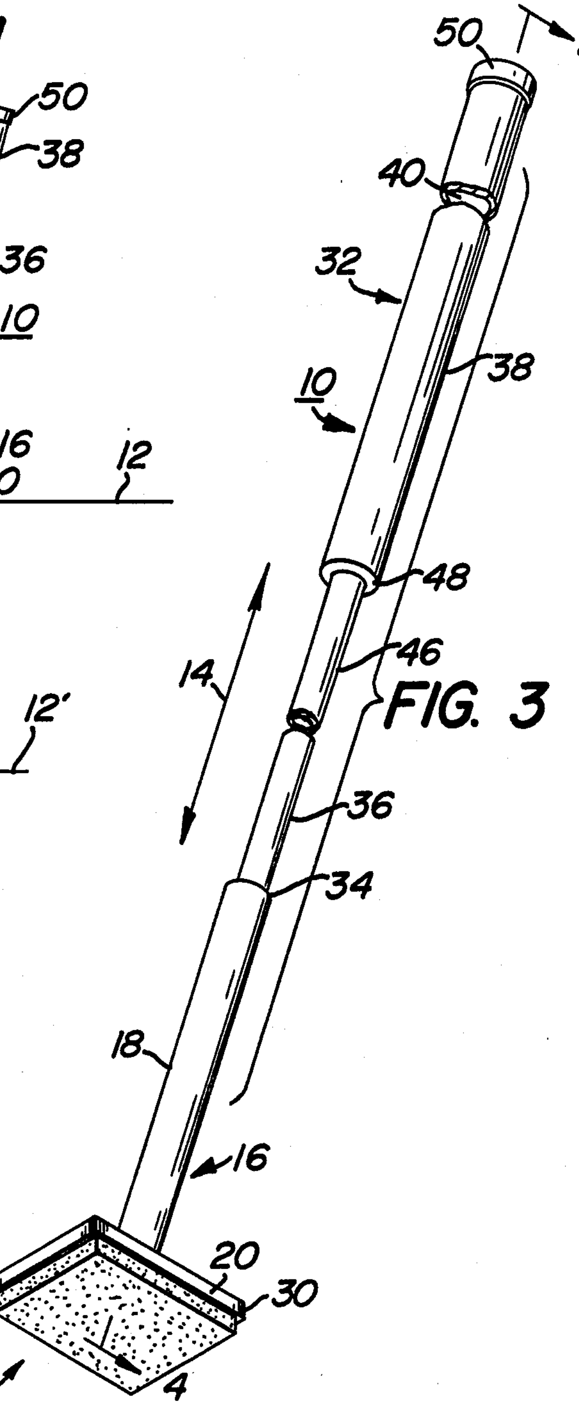
FIG. 3
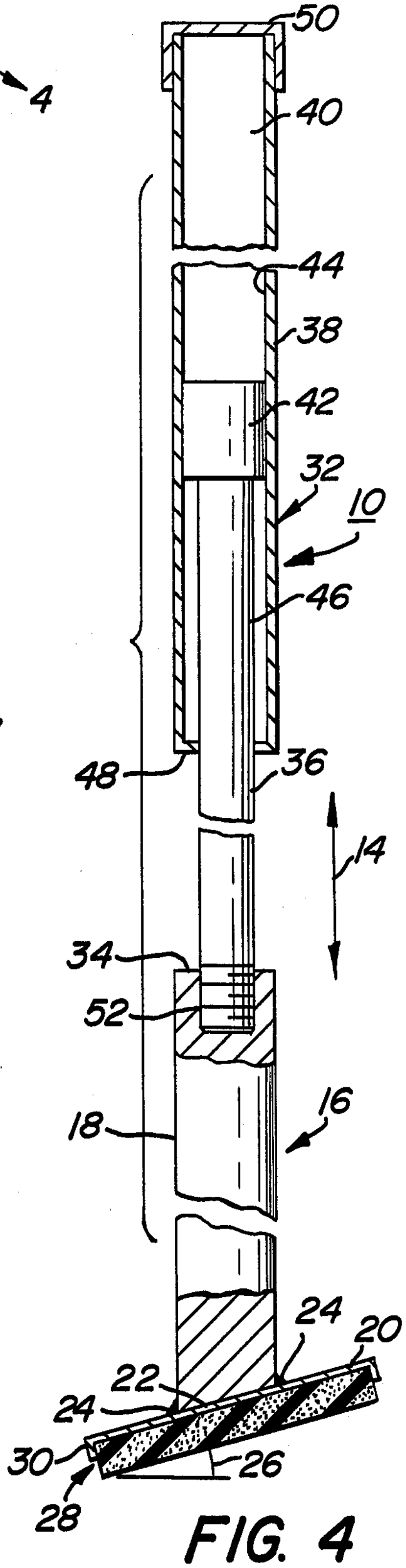
FIG. 4

MAGNETIC TOOL

BACKGROUND OF THE INVENTION

1. Field of the Invention

This invention pertains to magnetic tools for picking up metallic elements which are magnetically attractable. In particular, this invention relates to a magnetic tool which is adjustable in an extended length position. Still further, this invention pertains to a magnetic tool which allows removability of a telescoping handle portion from a first handle section for ease of manipulation. More in particular, this invention pertains to a magnetic tool having a lower magnetic element positionally mounted in a predetermined manner to the extended length of the magnetic tool for ease of manipulation by a user. More in particular, this invention relates to a magnetic tool formed of a lower density material for ease of manipulation by a user.

2. Prior Art

Magnetic tools for picking up metallic elements are known in the art. However, some of these prior art magnetic tools utilize electromagnetic actuation and are generally adapted for use in picking up high weight metallic elements. Such prior art magnetic tools are not adaptable for use by a user in a manual manner.

In other magnetic tools for picking up metallic elements, passive magnetics are known to have been used in the art. However, in general, such prior art magnetic tools do not provide for adjustable length tool sections. Such adjustability may not have deliterous effects on a normally co-ordinated user. However, where a handicapped person is involved, the manipulation of such magnetic tools into inaccessible areas is a problem and may not permit the picking up of the desired metallic elements.

Other types of magnetic tools in the prior art do not provide for releaseable sections of the magnetic tools in order to allow use of the magnetic tool on different base surfaces at various external locations with respect to the user. Thus, when such magnetic tools are utilized on surfaces in close proximity to the user, manipulation of the tools may be a handicap in that excessive amounts of energy may have to be utilized to manipulate the tool.

SUMMARY OF THE INVENTION

A magnetic tool for releaseably securing metallic members thereto which includes a first handle mechanism adapted to be gripped in one hand of a user. The magnetic tool includes a magnetic element secured to a lower end of the first handle mechanism. A telescoping handle mechanism is releaseably insertable within an upper end of the first handle mechanism.

BRIEF DESCRIPTION OF THE DRAWINGS

FIG. 1 is an elevational view of the magnetic tool showing use of the magnetic tool in its extended position;

FIG. 2 is an elevational view of the magnetic tool where the telescoping handle mechanism is removed for purposes of using the magnetic tool on a base surface in close proximity to the user;

FIG. 3 is a perspective view of the magnetic tool showing the tool in a partially extended position;

FIG. 4 is a sectional view of the magnetic tool taken along the section line 4—4 of FIG. 3;

DESCRIPTION OF THE PREFERRED EMBODIMENTS

Figure 5:
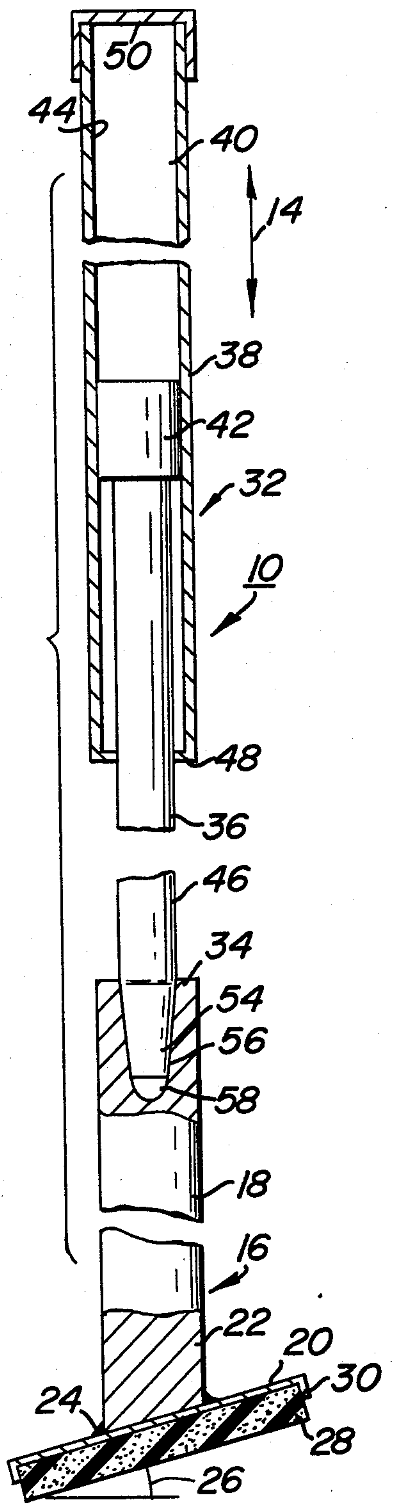
FIG. 5 is an embodiment of the magnetic tool taken in section showing the force fit of the telescoping handle mechanism within the first handle section.

Referring now to FIGS. 1 - 4 there is shown magnetic tool 10 for releaseably securing metallic members thereto. Magnetic tool 10 is used specifically for picking up magnetically attractable metallic members from base surface 12 which may be a floor section or another type of inaccessible area. The overall construction of magnetic tool 10 has been designed in particular for handicapped persons to provide a telescoping tool which may be adjusted in longitudinal direction 14 and having portions removably demountable from other sections of magnetic tool 10 in order that the tool may be utilized for desk type cleaning operations. In the manner shown in FIG. 1, magnetic tool 10 may be adjusted in extended direction 14 to pick up metallic member such as pins, clips, or like metallic elements which are magnetically attractable from floor surface 12 when a person is restrained in a sitting position. Additionally, magnetic tool 10 constructionally allows the user to removably detach various members or elements to provide a hand held section easily adapted to be held in one hand of the user for cleaning a desk top surface 12' as is shown in FIG. 2.

Magnetic tool 10 includes first handle section 16 which is adapted to be gripped in one hand of a user when used as shown in FIG. 2. Additionally, first handle section 16 is adapted to receive other sections of magnetic tool 10 as will be described in the following paragraphs. First handle 16 includes first rod member 18 having an extended length in longitudinal direction 14 as is shown. Plate member 20 is secured in rigid fashion to lower end 22 of first handle section 16. Plate member 20 is generally planar in contour and has a substantially rectangular or square contour. Plate member 20 is secured to lower end 22 of first handle section 16 through weld securement 24 or plate 20 may be molded in one piece construction to first handle section 16 through techniques well known in the art.

Mounting of plate member 20 to first handle section 16 provides for included angle 26 as shown in FIG. 4 to provide ease of handling and mating interface with base surface 12 during use of magnetic tool 10. Although dependent upon the angle by which tool 10 is gripped and the particular extended length of the various sections of magentic tool 10, it has been successfully demonstrated that tool 10 has an increased ease of manipulation when included angle 26 is between 5°–25°. Included angle 26 may only be a convenience construction for persons of normal manipulation capabilities, however, where manipulation capabilities are restricted such as in the case of handicapped persons, included angle 26 provides a distinct advantage in allowing the person to pick up metallic members which would otherwise be inaccessible.

Magnet mechanism 28 is secured to lower end 22 of first handle section 16. Magnetic mechanism 28 is secured to plate member 20 for attracting metallic members on base surfaces 12 or 12'. Plate member 20 may include flange extensions 30 passing around the peripheral contour as is shown in FIGS. 1–4. Magnetic mechanism 28 includes a contour similar to the overall contour of plate member 20 and may be insertable partially therein within flange extensions 30. Magnetic mechanism 28 may be a hard formed magnet or may be a resilient member such as that commonly known as rubberized magnetic material which is formed of a rubber material having magnetic particles embedded therein as is well known in the art.

Magnetic element 28 may be secured to plate member 20 through adhesive contact, or through screw members or some like technique not important to the inventive concept as is herein developed. Of importance, magnet element 28 is securely fastened to plate member 20 and is not removable therefrom during normal operations of magnetic tool 10. Plate member 20 and first rod member 18 forming first handle section 16 may be formed of a light weight metal such as aluminum or some like low density material. In this form, plate member 20 may very well be welded to first rod member 18. In another type of material formation, first handle section 16 may be formed of a plastic material wherein plate member 20 may possibly formed in one piece molded construction to first rod member 18. Utilization of low density materials in the construction of first handle section 16 may be extremely relevant where a person of limited manipulation capabilities and strength is involved in the operation of magnetic tool 10. As is well known in the stress analysis art, as the various sections of magnetic tool 10 are extended in longitudinal direction 14, the bending moment increases and the weight or force felt by a person is substantially increased as the length of tool 10 is adjusted into an extended length mode of operation.

Magnetic tool 10 includes telescoping handle portion 32 which is releaseably insertable within upper end 34 of first handle section 16. Telescoping handle 32 includes second rod member 36 adapted for releaseable insert within upper end 34 of first rod member 18 as is clearly shown in FIGS. 4, 5, and 6. Telescoping handle section 32 further includes tubular member 38 which is extended in longitudinal direction 14. Second rod member 36 is slideably displaceable within longitudinally extending passage 40 of tubular member 38.

Second rod member 36 includes upper rod element 42 of substantially the same diameter but slightly less than the diameter defined by tubular passage 40. In this manner, second rod member 36 frictionally engages internal wall 44 of tubular member 38 for releaseably maintaining a predetermined length of second rod member 36 and tubular member 38 in longitudinal direction 14. Second rod member 36 further includes lower rod section 46 which has lower diameter value than that defined by tubular passage 40 in order that second rod member 36 may be moveably displaced with passage 40 of tubular member 38. In order to maintain second rod member 36 within capturing relation within tubular member 38, tubular member 38 has lower wall 48 formed around and substantially in contiguous contact with lower rod element 46. Thus, with the extended diameter of upper rod element 42, second rod member 36 may be moveably displaced within tubular passage 40 throughout its length, however, the diameter of lower wall 48 is less than the diameter of upper rod element 42 thereby negating the possibility of the removal of second rod member 36 from a lower end of tubular member 38. Additionally, tubular member 38 includes cap member 50 which is secured to an upper portion of tubular member 38. Cap member 50 may be adhesively secured to tubular member 38 or may be bolted, screwed or secured in some like technique well known in the art. In this manner, second rod member 36 is maintained internal to tubular member 38 within tubular passage 40 throughout operation of magnetic tool 10.

As is shown in FIG. 4, second rod member 36 is insertable in a releaseable manner within upper end 34 of first handle section 16. In the preferred embodiment as shown in FIG. 4, second rod member 36 includes threaded portion 52 which matingly engages threads formed in upper end 34 of first handle section 16. Thus, telescoping handle 32 may be removed from first handle section 16 by appropriate rotation of second rod member 36 to achieve a section of magnetic tool 10 adapted for desk top use as shown in FIG. 2.

Second rod member 36 and tubular member 38 may be constructed of a low density metal such as aluminum or may be formed of plastic material much in the same manner as has been described for first handle section 16 and for the same purposes as has been previously described.

Referring now to FIG. 5 there is shown an embodiment of magnetic tool 10 which utilizes a different type of attachment of second rod member 36 to first handle section 16. In this embodiment, second rod member 36 includes lower tapered section 54 which is insertable within bore 56 within first rod member 18. The largest diameter of bore 56 is substantially equal to the diameter of lower rod element 46 to provide insert capabilities of second rod member 36. It is to be noted that the extended length of tapered bore 56 within upper end 34 of first handle section 16 is in excess of the length of lower tapered section 54 of second rod member 36. This provides for lower volume 58 within which tapered section 54 may be further resiliently forced. Due to the resiliency of both first rod member 18 and second rod member 36, lower volume 58 may be utilized to allow force fit in a manner acceptable by a user.

Figure 6:
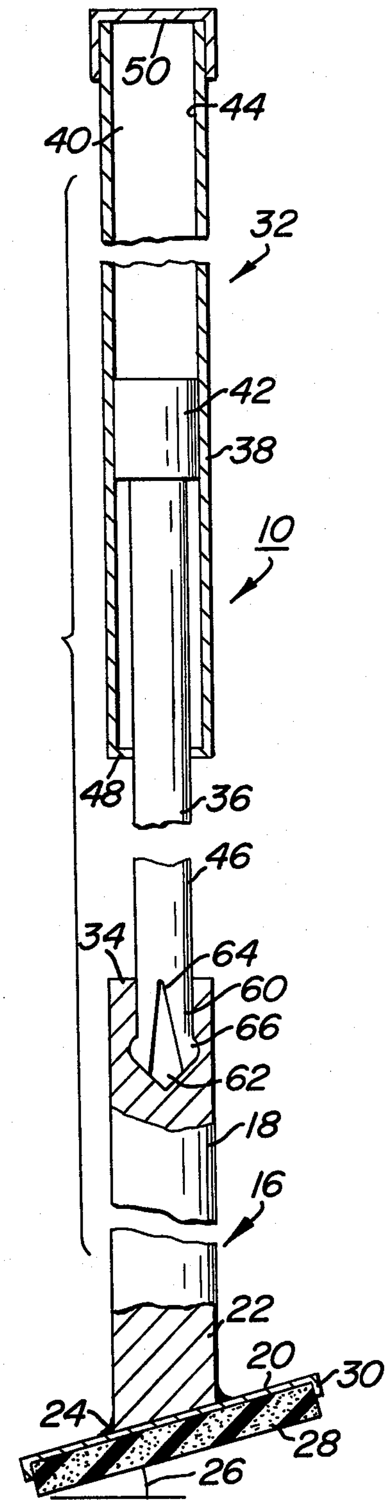
FIG. 6 is a further embodiment of the magnetic tool taken in section showing a snap spring type insert of the telescoping handle mechanism within the first handle section.

Referring now to the embodiment shown in FIG. 6, it is seen that lower rod element 46 of second rod element 36 includes spring snap element 60. Spring snap 60 may include a V-notch 64 and includes lower rib element 66 having a diameter substantially in excess of the diameter of bore 62 at upper end 34 of first handle section 16. Bore 62 has a corresponding lower external wall which is contoured to accept extended diameter rib element 66 as is seen in FIG. 6. V-notch 64 is provided to allow resiliency in the transverse direction in order that extended diameter rib elements 66 may be compressably moved or deformed to pass through the upper section of bore 62 prior to insert into mating engagement with a lower section of bore 62. Thus, in this embodiment, telescoping handle 32 may be inserted within first handle section 16 and releaseably maintained therein until removal is accomplished at the discretion of the user.

Although this invention has been described in connection with specific forms and embodiments thereof, it will be appreciated that various modifications other than those discussed above may be resorted to without departing from the spirit or the scope of the invention. For example, equivalent elements may be substituted for those specifically shown and described, certain structures may be used independently of other features, and in certain cases, particular locations of elements may be reversed or interposed, all without departing from the spirit or the scope of the invention as defined in the appended claims.

What is claimed is:

1. A magnetic tool for releasably securing metallic members thereto, comprising:

(a) first handle means adapted to be gripped in one hand of a user, said first handle means having a first rod member extendable in a longitudinal direction and a plate member secured to said lower end of said first rod member, said plate member forming a predetermined acute angle with said first rod member extension, said magnetic means being secured to said plate member;

(b) magnetic means secured to a lower end of said first handle means; and (c) telescoping handle means releasably insertable within an upper end of said first handle means, said telescoping handle means having a second rod member releasably insertable within an upper end of said first rod member and a longitudinally extended tubular member having a passage for slidable insert of said second rod member, said passage having an extended diameter terminal end for insert of a spring snap element adapted to be compressed on insert within an upper portion of said passage and to expand within said terminal end for securement therein.

2. The magnetic tool as recited in claim 1 where said magnetic means includes a magnetic rubber element being adhesively secured to said plate member.

3. The magnetic tool as recited in claim 1 where said second rod member frictionally engages an internal wall of said tubular member for releaseably maintaining a predetermined length of said second rod member and said tubular member in said longitudinal direction.

4. The magnetic tool as recited in claim 1 where said first handle means and said telescoping handle means are formed of a plastic material.

5. The magnetic tool as recited in claim 1 where said second rod member is captured within said tubular member, said second rod member being displaceable within said extending passage.

* * * * *